US009800938B2

(12) United States Patent
Keipert

(10) Patent No.: US 9,800,938 B2
(45) Date of Patent: Oct. 24, 2017

(54) DISTRACTION BOOKMARKS FOR LIVE AND RECORDED VIDEO

(71) Applicant: EchoStar Technologies LLC, Englewood, CO (US)

(72) Inventor: Kurt Keipert, Littleton, CO (US)

(73) Assignee: ECHOSTAR TECHNOLOGIES L.L.C., Englewood, CO (US)

(*) Notice: Subject to any disclaimer, the term of this patent is extended or adjusted under 35 U.S.C. 154(b) by 0 days.

(21) Appl. No.: 14/591,474

(22) Filed: Jan. 7, 2015

(65) Prior Publication Data
US 2016/0198229 A1 Jul. 7, 2016

(51) Int. Cl.
H04H 60/56 (2008.01)
H04N 21/472 (2011.01)
H04N 21/442 (2011.01)
G11B 27/34 (2006.01)
H04N 21/845 (2011.01)
G11B 27/10 (2006.01)
G06K 9/00 (2006.01)
H04N 21/488 (2011.01)
H04N 21/4223 (2011.01)
H04N 21/432 (2011.01)
(Continued)

(52) U.S. Cl.
CPC ... H04N 21/47217 (2013.01); G06K 9/00268 (2013.01); G11B 27/10 (2013.01); G11B 27/34 (2013.01); H04N 21/4223 (2013.01); H04N 21/42203 (2013.01); H04N 21/4325 (2013.01); H04N 21/44218 (2013.01); H04N 21/4882 (2013.01); H04N 21/8456 (2013.01); H04N 21/42201 (2013.01); H04N 21/4312 (2013.01)

(58) Field of Classification Search
CPC ....... H04N 21/47217; H04N 21/44218; H04N 21/8456; H04N 21/4882; H04N 21/42203; H04N 21/4223; H04N 21/4325; H04N 21/4312; H04N 21/42201
See application file for complete search history.

(56) References Cited

U.S. PATENT DOCUMENTS 6,005,562 A 12/1999 Shiga et al.
6,177,931 B1 1/2001 Alexander et al.
6,529,230 B1 3/2003 Chong
(Continued)

FOREIGN PATENT DOCUMENTS

EP 1 865 716 A2 12/2007
EP 2 309 733 B1 4/2011
(Continued)

OTHER PUBLICATIONS

Extended European Search Report for EP 11166892.7 dated Oct. 6, 2011, 7 pages.
(Continued)

Primary Examiner — Yassin Alata
(74) Attorney, Agent, or Firm — Kilpatrick Townsend & Stockton LLP

(57) ABSTRACT

Systems and methods for tagging media content may include detecting a distraction event during presentation of a media content via a display device, creating a digital bookmark for the media content, whereby the digital bookmark corresponds to the detected distraction event, and outputting a user interface for presenting the digital bookmark through the display device.

18 Claims, 6 Drawing Sheets

(51) Int. Cl.
  *H04N 21/431*  (2011.01)
  *H04N 21/422*  (2011.01)

(56) References Cited

U.S. PATENT DOCUMENTS

| | | |
|---|---|---|
| 6,681,396 B1 | 1/2004 | Bates et al. |
| 6,774,924 B2 | 8/2004 | Kato et al. |
| 7,174,512 B2 | 2/2007 | Martin et al. |
| 7,197,715 B1 | 3/2007 | Valeria |
| 7,633,887 B2 | 12/2009 | Panwar et al. |
| 7,680,894 B2 | 3/2010 | Diot et al. |
| 7,774,811 B2 | 8/2010 | Poslinski et al. |
| 7,818,368 B2 | 10/2010 | Yang et al. |
| 7,825,989 B1 | 11/2010 | Greenberg |
| 7,849,487 B1 | 12/2010 | Vosseller |
| 8,024,753 B1 | 9/2011 | Kummer et al. |
| 8,046,798 B1 | 10/2011 | Schlack et al. |
| 8,079,052 B2 | 12/2011 | Chen et al. |
| 8,104,065 B2 | 1/2012 | Aaby et al. |
| 8,209,713 B1 | 6/2012 | Lai et al. |
| 8,296,797 B2 | 10/2012 | Olstad et al. |
| 8,312,486 B1 | 11/2012 | Briggs et al. |
| 8,424,041 B2 | 4/2013 | Candelore et al. |
| 8,427,356 B1 | 4/2013 | Satish |
| 8,627,349 B2 | 1/2014 | Kirby et al. |
| 8,667,527 B2 | 3/2014 | Yan et al. |
| 8,689,258 B2 | 4/2014 | Kemp |
| 8,752,084 B1 | 6/2014 | Lai et al. |
| 8,855,681 B1 | 10/2014 | George et al. |
| 8,973,038 B2 | 3/2015 | Gratton |
| 8,973,068 B2 | 3/2015 | Kotecha et al. |
| 8,990,418 B1 | 3/2015 | Bragg et al. |
| 9,038,127 B2 | 5/2015 | Hastings et al. |
| 9,066,156 B2 | 6/2015 | Kapa |
| 9,213,986 B1 | 12/2015 | Buchheit et al. |
| 9,253,533 B1 | 2/2016 | Morgan et al. |
| 9,264,779 B2 | 2/2016 | Kirby et al. |
| 9,420,333 B2 | 8/2016 | Martch et al. |
| 9,426,516 B2 | 8/2016 | Kemp |
| 9,565,474 B2 | 2/2017 | Petruzzelli et al. |
| 9,602,875 B2 | 3/2017 | Hussain |
| 9,609,379 B2 | 3/2017 | Martch et al. |
| 9,621,959 B2 | 4/2017 | Mountain |
| 2001/0013123 A1 | 8/2001 | Freeman et al. |
| 2001/0026609 A1 | 10/2001 | Weinstein et al. |
| 2002/0059610 A1 | 5/2002 | Ellis |
| 2002/0067376 A1 | 6/2002 | Martin et al. |
| 2002/0075402 A1 | 6/2002 | Robson et al. |
| 2002/0174430 A1 | 11/2002 | Ellis et al. |
| 2002/0178444 A1 | 11/2002 | Trajkovic et al. |
| 2003/0023742 A1 | 1/2003 | Allen et al. |
| 2003/0056220 A1 | 3/2003 | Thornton et al. |
| 2003/0066077 A1 | 4/2003 | Gutta et al. |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0154485 A1 | 8/2003 | Johnson et al. |
| 2003/0188317 A1 | 10/2003 | Liew et al. |
| 2003/0189674 A1 | 10/2003 | Inoue et al. |
| 2003/0208763 A1 | 11/2003 | McElhatten et al. |
| 2003/0229899 A1 | 12/2003 | Thompson et al. |
| 2004/0019489 A1 | 1/2004 | Funk et al. |
| 2004/0181807 A1 | 9/2004 | Theiste et al. |
| 2005/0030977 A1 | 2/2005 | Casey et al. |
| 2005/0044570 A1 | 2/2005 | Poslinski |
| 2005/0071865 A1 | 3/2005 | Martins |
| 2005/0125302 A1 | 6/2005 | Brown et al. |
| 2005/0152565 A1 | 7/2005 | Jouppi et al. |
| 2005/0166230 A1 | 7/2005 | Gaydou et al. |
| 2005/0180568 A1 | 8/2005 | Krause |
| 2005/0191041 A1 | 9/2005 | Braun et al. |
| 2005/0240961 A1 | 10/2005 | Jerding et al. |
| 2005/0264705 A1 | 12/2005 | Kitamura |
| 2005/0275758 A1 | 12/2005 | McEvilly et al. |
| 2006/0020962 A1 | 1/2006 | Stark et al. |
| 2006/0085828 A1 | 4/2006 | Dureau et al. |
| 2006/0089870 A1 | 4/2006 | Myhr |
| 2006/0174277 A1 | 8/2006 | Sezan et al. |
| 2006/0190615 A1 | 8/2006 | Panwar et al. |
| 2006/0238656 A1 | 10/2006 | Chen et al. |
| 2006/0253581 A1 | 11/2006 | Dixon et al. |
| 2006/0282852 A1 | 12/2006 | Purpura et al. |
| 2006/0282869 A1 | 12/2006 | Plourde |
| 2007/0033616 A1 | 2/2007 | Gutta |
| 2007/0058930 A1 | 3/2007 | Iwamoto |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1 | 7/2007 | Cordray |
| 2007/0154169 A1 | 7/2007 | Cordray et al. |
| 2007/0157235 A1 | 7/2007 | Teunissen |
| 2007/0157249 A1 | 7/2007 | Cordray et al. |
| 2007/0157253 A1 | 7/2007 | Ellis et al. |
| 2007/0188655 A1 | 8/2007 | Ohta |
| 2007/0199040 A1 | 8/2007 | Kates |
| 2007/0204302 A1 | 8/2007 | Calzone |
| 2007/0226766 A1 | 9/2007 | Poslinski et al. |
| 2007/0245379 A1 | 10/2007 | Agnihortri |
| 2008/0022012 A1 | 1/2008 | Wang |
| 2008/0060006 A1 | 3/2008 | Shanks et al. |
| 2008/0086743 A1 | 4/2008 | Cheng et al. |
| 2008/0097949 A1 | 4/2008 | Kelly et al. |
| 2008/0109307 A1 | 5/2008 | Ullah |
| 2008/0123825 A1 | 5/2008 | Abramson et al. |
| 2008/0134043 A1 | 6/2008 | Georgis et al. |
| 2008/0163305 A1 | 7/2008 | Johnson et al. |
| 2008/0195457 A1 | 8/2008 | Sherman et al. |
| 2008/0235348 A1 | 9/2008 | Dasgupta |
| 2008/0239169 A1 | 10/2008 | Moon et al. |
| 2008/0282312 A1 | 11/2008 | Blinnikka |
| 2008/0300982 A1 | 12/2008 | Larson et al. |
| 2008/0305832 A1 | 12/2008 | Greenberg |
| 2008/0320523 A1 | 12/2008 | Morris et al. |
| 2009/0044217 A1 | 2/2009 | Lutterbach et al. |
| 2009/0055385 A1 | 2/2009 | Jeon et al. |
| 2009/0102984 A1 | 4/2009 | Arling et al. |
| 2009/0138902 A1 | 5/2009 | Kamen |
| 2009/0150941 A1 | 6/2009 | Riedl et al. |
| 2009/0178071 A1 | 7/2009 | Whitehead |
| 2009/0234828 A1 | 9/2009 | Tu |
| 2009/0249412 A1 | 10/2009 | Bhogal et al. |
| 2009/0276803 A1 | 11/2009 | Weaver |
| 2009/0282445 A1 | 11/2009 | Yang et al. |
| 2009/0293093 A1 | 11/2009 | Igarashi |
| 2009/0299824 A1 | 12/2009 | Barnes, Jr. |
| 2009/0325523 A1 | 12/2009 | Choi |
| 2010/0031306 A1 | 2/2010 | Pandey et al. |
| 2010/0040151 A1 | 2/2010 | Garrett |
| 2010/0071007 A1 | 3/2010 | Meijer |
| 2010/0071062 A1 | 3/2010 | Choyi et al. |
| 2010/0089996 A1 | 4/2010 | Koplar |
| 2010/0115554 A1 | 5/2010 | Drouet et al. |
| 2010/0122294 A1 | 5/2010 | Craner |
| 2010/0146560 A1 | 6/2010 | Bonfrer |
| 2010/0153983 A1 | 6/2010 | Philmon et al. |
| 2010/0153999 A1 | 6/2010 | Yates |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0262986 A1 | 10/2010 | Adimatyam et al. |
| 2010/0269144 A1 | 10/2010 | Forsman et al. |
| 2010/0319019 A1 | 12/2010 | Zazza |
| 2010/0322592 A1 | 12/2010 | Casagrande |
| 2010/0333131 A1 | 12/2010 | Parker et al. |
| 2011/0016492 A1 | 1/2011 | Morita |
| 2011/0019839 A1 | 1/2011 | Nandury |
| 2011/0030016 A1 | 2/2011 | Pino et al. |
| 2011/0052156 A1 | 3/2011 | Kuhn |
| 2011/0072448 A1 | 3/2011 | Stiers et al. |
| 2011/0109801 A1 | 5/2011 | Thomas et al. |
| 2011/0202956 A1 | 8/2011 | Connelly et al. |
| 2011/0206342 A1 | 8/2011 | Thompson et al. |

(56) References Cited

U.S. PATENT DOCUMENTS

| | | |
|---|---|---|
| 2011/0239249 A1 | 9/2011 | Murison et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2012/0020641 A1* | 1/2012 | Sakaniwa ............ G11B 27/105 386/230 |
| 2012/0052941 A1 | 3/2012 | Mo |
| 2012/0060178 A1 | 3/2012 | Minakuchi et al. |
| 2012/0066722 A1 | 3/2012 | Cheung et al. |
| 2012/0106932 A1 | 5/2012 | Grevers, Jr. |
| 2012/0131613 A1 | 5/2012 | Ellis et al. |
| 2012/0185895 A1 | 7/2012 | Wong et al. |
| 2012/0204209 A1 | 8/2012 | Kubo |
| 2012/0230651 A1 | 9/2012 | Chen |
| 2012/0246672 A1 | 9/2012 | Sridhar et al. |
| 2012/0278837 A1 | 11/2012 | Curtis et al. |
| 2012/0311633 A1 | 12/2012 | Mandrekar et al. |
| 2013/0014159 A1 | 1/2013 | Wiser et al. |
| 2013/0055304 A1 | 2/2013 | Kirby et al. |
| 2013/0061313 A1 | 3/2013 | Cullimore et al. |
| 2013/0070044 A1 | 3/2013 | Naidoo et al. |
| 2013/0074109 A1 | 3/2013 | Skelton et al. |
| 2013/0114940 A1 | 5/2013 | Merzon et al. |
| 2013/0128119 A1 | 5/2013 | Madathodiyil et al. |
| 2013/0174196 A1 | 7/2013 | Herlein |
| 2013/0194503 A1 | 8/2013 | Yamashita |
| 2013/0232148 A1 | 9/2013 | MacDonald et al. |
| 2013/0263189 A1 | 10/2013 | Garner |
| 2013/0283162 A1 | 10/2013 | Aronsson et al. |
| 2013/0298151 A1 | 11/2013 | Leske et al. |
| 2013/0332962 A1 | 12/2013 | Moritz et al. |
| 2013/0346302 A1 | 12/2013 | Purves et al. |
| 2014/0032709 A1 | 1/2014 | Saussy et al. |
| 2014/0067998 A1 | 3/2014 | Garcia et al. |
| 2014/0068675 A1 | 3/2014 | Mountain |
| 2014/0123160 A1 | 5/2014 | van Coppenolle et al. |
| 2014/0139555 A1 | 5/2014 | Levy |
| 2014/0140680 A1 | 5/2014 | Jo |
| 2014/0153904 A1 | 6/2014 | Adimatyam et al. |
| 2014/0157327 A1 | 6/2014 | Roberts et al. |
| 2014/0215539 A1 | 7/2014 | Chen et al. |
| 2014/0218517 A1 | 8/2014 | Kim et al. |
| 2014/0247931 A1 | 9/2014 | Swamy et al. |
| 2014/0282714 A1 | 9/2014 | Hussain |
| 2014/0282741 A1 | 9/2014 | Shoykhet |
| 2014/0282745 A1 | 9/2014 | Chipman et al. |
| 2014/0282759 A1 | 9/2014 | Harvey et al. |
| 2014/0294201 A1 | 10/2014 | Johnson et al. |
| 2014/0310075 A1 | 10/2014 | Ricci |
| 2014/0310819 A1 | 10/2014 | Cakarel et al. |
| 2014/0313341 A1 | 10/2014 | Stribling |
| 2014/0325556 A1* | 10/2014 | Hoang ................. H04N 21/431 725/32 |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0020097 A1 | 1/2015 | Freed et al. |
| 2015/0040176 A1 | 2/2015 | Hybertson et al. |
| 2015/0052568 A1 | 2/2015 | Glennon et al. |
| 2015/0054910 A1 | 2/2015 | Offen et al. |
| 2015/0058890 A1 | 2/2015 | Kapa |
| 2015/0095932 A1 | 4/2015 | Ren |
| 2015/0118992 A1 | 4/2015 | Wyatt et al. |
| 2015/0143408 A1 | 5/2015 | Sallas |
| 2015/0156612 A1 | 6/2015 | Vemaulapalli |
| 2015/0181132 A1 | 6/2015 | Kummer et al. |
| 2015/0181279 A1 | 6/2015 | Martch et al. |
| 2015/0249803 A1 | 9/2015 | Tozer et al. |
| 2015/0249864 A1 | 9/2015 | Tang et al. |
| 2015/0310725 A1 | 10/2015 | Koskan et al. |
| 2015/0334461 A1 | 11/2015 | Yu |
| 2016/0066020 A1 | 3/2016 | Mountain |
| 2016/0066026 A1 | 3/2016 | Mountain |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli et al. |
| 2016/0191147 A1 | 6/2016 | Martch |
| 2016/0309212 A1 | 10/2016 | Martch et al. |
| 2017/0111696 A1 | 4/2017 | Petruzzelli et al. |

FOREIGN PATENT DOCUMENTS

| | | |
|---|---|---|
| EP | 2 403 239 A1 | 1/2012 |
| FR | 2 902 568 A1 | 12/2007 |
| JP | H10 322622 A | 4/1998 |
| JP | 2006-245745 A | 9/2006 |
| KR | 2004 0025073 A | 3/2004 |
| KR | 2006 0128295 A | 12/2006 |
| WO | 98/37694 A1 | 8/1998 |
| WO | 2004/068386 A1 | 8/2004 |
| WO | 2005/059807 A2 | 6/2005 |
| WO | 2007/064987 A2 | 7/2007 |
| WO | 2007/098067 A1 | 8/2007 |
| WO | 2009/073925 A1 | 6/2009 |
| WO | 2013/016626 A1 | 1/2013 |
| WO | 2014/072742 A1 | 5/2014 |
| WO | 2014/179017 A1 | 11/2014 |
| WO | 2016/030384 | 3/2016 |
| WO | 2016/030477 A1 | 3/2016 |
| WO | 2016/034899 A1 | 3/2016 |
| WO | 2016/055761 A1 | 4/2016 |

OTHER PUBLICATIONS

Extended European Search Report for EP 14160140.1 dated Jul. 7, 2014, 7 pages.
International Search Report and Written Opinion of PCT/US2014/033796 dated Sep. 5, 2014, 12 pages.
U.S. Appl. No. 14/200,864, filed Mar. 7, 2014, Non-Final Office Action dated Dec. 5, 2014, 35 pages.
U.S. Appl. No. 14/095,860, filed Dec. 3, 2013 Non-Final Office Action dated Dec. 26, 2014, 45 pages.
U.S. Appl. No. 13/971,579, filed Aug. 20, 2013 Non Final Office Action dated Oct. 28, 2014, 35 pages.
U.S. Appl. No. 13/971,579, filed Aug. 20, 2013 Notice of Allowance dated Feb. 27, 2015, 28 pages.
U.S. Appl. No. 13/942,451, filed Jul. 15, 2013 Non Final Office Action dated Jul. 28, 2014, 27 pages.
U.S. Appl. No. 13/919,702, filed Jun. 17, 2013 Non Final Office Action dated Jun. 11, 2014, 25 pages.
U.S. Appl. No. 13/919,702, filed Jun. 17, 2013 Final Office Action dated Nov. 18, 2014, 24 pages.
U.S. Appl. No. 13/886,873 filed May 3, 2013, Notice of Allowance dated Oct. 24, 2014, 40 pages.
U.S. Appl. No. 14/470,248, filed Aug. 27, 2014, Preinterview first office action dated Sep. 4, 2015, 22 pages.
U.S. Appl. No. 14/470,279, filed Aug. 27, 2014, Preinterview first office action dated Aug. 26, 2015, 23 pages.
U.S. Appl. No. 14/479,007, filed Sep. 5, 2014, Non-Final Office Action dated Sep. 1, 2015, 44 pages.
U.S. Appl. No. 14/139,299, filed Dec. 23, 2013, Non Final Office Action dated Aug. 14, 2015, 39 pages.
Office Action for EP 14160140.1 dated Jan. 19, 2016, 5 pages.
International Search Report and Written Opinion for PCT/EP2015/069461 dated Oct. 1, 2015, 13 pages.
International Search Report and Written Opinion for PCT/EP2015/069456 dated Oct. 5, 2015, all pages.
International Preliminary Report on Patentability for PCT/US2014/033796 dated Nov. 3, 2015, all pages.
International Search Report and Written Opinion for PCT/EP2015/069681 dated Nov. 23, 2015, 12 pages.
International Search Report and Written Opinion for PCT/GB2015/052570 dated Dec. 11, 2015, 13 pages.

(56) References Cited

OTHER PUBLICATIONS

U.S. Appl. No. 14/470,279, filed Aug. 27, 2014, Final Office Action dated Jan. 22, 2016, 25 pages.
U.S. Appl. No. 14/494,079, filed Sep. 23, 2014, Preinterview first office action dated Feb. 10, 2016, 6 pages.
U.S. Appl. No. 14/095,860, filed Dec. 3, 2013 Notice of Allowance dated Oct. 19, 2015, 14 pages.
U.S. Appl. No. 13/942,451, filed Jul. 15, 2013 Non Final Office Action dated Jan. 8, 2016, 41 pages.
U.S. Appl. No. 13/919,702, filed Jun. 17, 2013 Final Office Action dated Dec. 31, 2015, 30 pages.
U.S. Appl. No. 14/071,613, filed Nov. 4, 2013 Final Office Action dated Oct. 8, 2015, 11 pages.
U.S. Appl. No. 14/470,392, filed Aug. 27, 2014 Non Final Office Action dated Nov. 5, 2015, 31 pages.
U.S. Appl. No. 14/470,415, filed Aug. 27, 2014 Non Final Office Action dated Nov. 18, 2015, 28 pages.
U.S. Appl. No. 14/470,248, filed Aug. 27, 2014, Final Office Action dated Feb. 16, 2016, 26 pages.
U.S. Appl. No. 14/200,864, filed Mar. 7, 2014 Non-Final Office Action dated Feb. 18, 2016, 61 pages.
U.S. Appl. No. 14/479,007, filed Sep. 5, 2014, Final Office Action dated Feb. 22, 2016, 37 pages.
U.S. Appl. No. 14/139,299, filed Dec. 23, 2013, Final Office Action dated Feb. 25, 2016, all pages.
U.S. Appl. No. 14/139,420, filed Dec. 23, 2013 Notice of Allowance dated Mar. 31, 2016, 37 pages.
U.S. Appl. No. 14/470,392, filed Aug. 27, 2014 Final Office Action dated Mar. 4, 2016, all pages.
U.S. Appl. No. 14/470,415, filed Aug. 27, 2014 Final Office Action dated Mar. 3, 2016, all pages.
U.S. Appl. No. 14/470,248, filed Aug. 27, 2014, Non Final Office Action dated Jul. 25, 2016, all pages.
U.S. Appl. No. 14/470,279, filed Aug. 27, 2014, Non Final Office Action dated Jul. 19, 2016, all pages.
U.S. Appl. No. 14/479,007, filed Sep. 5, 2014, Non-Final Office Action dated Jul. 27, 2016, 37 pages.
U.S. Appl. No. 13/942,451, filed Jul. 15, 2013 Final Office Action dated Jun. 22, 2016, all pages.
U.S. Appl. No. 13/919,702, filed Jun. 17, 2013 Non Final Office Action dated Jun. 30, 2016, all pages.
U.S. Appl. No. 14/139,299, filed Dec. 23, 2013, Non Final Office Action dated Jun. 20, 2016, all pages.
U.S. Appl. No. 14/470,392, filed Aug. 27, 2014 Non-Final Office Action dated Aug. 5, 2016, all pages.
U.S. Appl. No. 14/470,415, filed Aug. 27, 2014 Non Final Office Action dated Jul. 29, 2016, all pages.
U.S. Appl. No. 14/200,864, filed Mar. 7, 2014 Notice of Allowance dated Sep. 15, 2016, all pages.
U.S. Appl. No. 15/195,527, filed Jun. 28, 2016, Non-Final Rejection dated Sep. 30, 2016, all pages.
U.S. Appl. No. 13/942,451, filed Jul. 15, 2013 Non Final Office Action dated Oct. 25, 2016, all pages.
U.S. Appl. No. 13/919,702, filed Jun. 17, 2013 Final Office Action dated Oct. 28, 2016, all pages.
International Search Report and Written Opinion for PCT/GB2015/052456 dated Jun. 13, 2016, all pages.
U.S. Appl. No. 14/470,248, filed Aug. 27, 2014, Final Office Action dated Dec. 9, 2016, all pages.
U.S. Appl. No. 14/470,279, filed Aug. 27, 2014, Final Office Action mailed Dec. 9, 2016, all pages.
U.S. Appl. No. 14/470,279, filed Aug. 27, 2014, Notice of Allowance dated Mar. 16, 2017, all pages.
U.S. Appl. No. 15/195,527, filed Jun. 28, 2016, Notice of Allowance dated Feb. 3, 2017, all pages.
U.S. Appl. No. 14/139,299, filed Dec. 23, 2013, Final Office Action dated Feb. 30, 2017, all pages.
U.S. Appl. No. 14/470,392, filed Aug. 27, 2014, Notice of Allowance dated Feb. 13, 2017, all pages.
International Preliminary Report on Patentability for PCT/GB2015/052456 dated Feb. 28, 2017, all pages.
U.S. Appl. No. 14/470,352, filed Aug. 27, 2014 Non Final Office Action dated Nov. 20, 2015, 28 pages.
U.S. Appl. No. 14/470,352, filed Aug. 27, 2014 Final Office Action dated Mar. 17, 2016, all pages.
U.S. Appl. No. 14/470,352, filed Aug. 27, 2014 Non Final Office Action dated Aug. 26, 2016, all pages.
U.S. Appl. No. 14/470,352, filed Aug. 27, 2014 Notice of Allowance dated Dec. 2, 2016, all pages.
International Search Report and Written Opinion for PCT/GB2015/052457 dated Nov. 13, 2015, 11 pages.
International Preliminary Report on Patentability for PCT/GB2015/052457 dated Feb. 28, 2017, all pages.
International Preliminary Report on Patentability for PCT/GB2015/052570 dated Mar. 7, 2017, all pages.
U.S. Appl. No. 14/981,509, filed Dec. 28, 2015, Preinterview first office action dated May 8, 2017, all pages.
U.S. Appl. No. 14/470,248, filed Aug. 27, 2014, Non-Final Office Action dated Apr. 20, 2017, all pages.
U.S. Appl. No. 13/942,451, filed Jul. 15, 2013 Final Rejection dated Apr. 19, 2017, all pages.
U.S. Appl. No. 13/919,702, filed Jun. 17, 2013 Non Final Office Action dated Apr. 28, 2017, all pages.
U.S. Appl. No. 14/200,864, filed Mar. 7, 2014 Final Office Action dated Jun. 18, 2015, 36 pages.
U.S. Appl. No. 14/095,860, filed Dec. 3, 2013 Notice of Allowance dated Jul. 13, 2015, 31 pages.
Jin S H et al., "Intelligent broadcasting system and services for personalized semantic contents consumption", Expert Systems With Applications, Oxford, GB, vol. 31, No. 1, Jul. 1, 2006, pp. 164-173, XP024962718, ISSN: 0957-4174, DOI: 10.1016/J.ESWA.2005.09.021.
Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.
European Search Report for EP 14197940.1 dated Apr. 28, 2015, 13 pages.
U.S. Appl. No. 14/139,420, filed Dec. 23, 2013 Non-Final Office Action dated Apr. 30, 2015, 27 pages.
U.S. Appl. No. 14/095,860, filed Dec. 3, 2013 Final Office Action dated May 1, 2015, 18 pages.
U.S. Appl. No. 14/071,613, filed Nov. 4, 2013 Non-Final Office Action dated May 18, 2015, 20 pages.
U.S. Appl. No. 13/942,451, filed Jul. 15, 2013 Final Office Action dated Apr. 30, 2015, 33 pages.
U.S. Appl. No. 13/919,702, filed Jun. 17, 2013 Non-Final Office Action dated Apr. 30, 2015, 26 pages.

\* cited by examiner

DISTRACTION BOOKMARKS FOR LIVE AND RECORDED VIDEO

CROSS-REFERENCES TO RELATED APPLICATIONS

N/A

BACKGROUND

Television viewers may become distracted while viewing live or recorded media content. The distracted television viewers may miss portions of the media content and wish to view the missed portions. In order to do so, the viewers must manually browse through the recording to locate the last scene they watched and playback from there. This manual process is cumbersome and time-consuming. There is a need for a more convenient approach to viewing missed portions of media content. This application is intended to address such issues and provide related advantages.

SUMMARY

In general, systems and methods disclosed herein are directed to tagging media content during presentation of the media content, and more particularly, to tagging media content upon detection of a distraction event during the presentation.

In one aspect, a method for tagging media content is provided. The method may include detecting, by a television receiver, a distraction event during presentation of a media content via a display device. The method may include creating, by the television receiver, a digital bookmark for the media content, whereby the digital bookmark corresponds to the detected distraction event. Further, the method may include outputting, by the television receiver, a user interface for presenting the digital bookmark via the display device.

Various embodiments of the present method may include one or more of the following features. The method may include receiving, by the television receiver, sensed data detected by a sensor, whereby the sensed data is indicative of the distraction event. The sensor may include at least one of a camera and a microphone. The method may include receiving, by the television receiver, a sensed movement detected by the sensor, determining, by the television receiver, the sensed movement corresponds to a user leaving an environment containing the display device, and/or determining, by the television receiver, presence of the distraction event based on the sensed movement. In other examples, the method may include receiving, by the television receiver, sensed data comprising a facial recognition imagery detected by the sensor, determining, by the television receiver, the facial recognition imagery corresponds to a user not looking at the media content being presented via the display device, and/or determining, by the television receiver, presence of the distraction event based on the sensed facial recognition imagery. In another example, the method may include receiving, by the television receiver, sensed data comprising an ambient noise level detected by the sensor, determining, by the television receiver, the ambient noise level exceeds a threshold noise level, and/or determining, by the television receiver, presence of the distraction event based on the ambient noise level exceeding the threshold noise level.

Further, the method may include determining, by the television receiver, that a time duration of the distraction event meets a minimum time duration, and in response to determining the time duration of the distraction event meeting the minimum time duration, creating, by the television receiver, the digital bookmark for the media content. The method may include determining, by the television receiver, a location of the distraction event in a media file of the media content, and/or tagging, by the television receiver, the media content with the digital bookmark at the determined location of the media file. In another example, the method may include determining, by the television receiver, a location of the distraction event in a media file of the media content, and/or tagging, by the television receiver, the media content with the digital bookmark at a setback location that precedes the determined location. The location of the distraction event may be based on a ratio of a current byte count to a total byte count. The current byte count may correspond to a file size of a portion of the media content preceding the distraction event, and the total byte count may correspond to a total file size of the media content.

Still further, the media content may include a broadcast television program. The method may include automatically removing, by the television receiver, the digital bookmark from the media content upon passage of a storage period of time for the digital bookmark. The method may include layering, by the television receiver, the user interface as an overlay on the media content being presented via the display device. Further, the method may include automatically outputting, by the television receiver, the user interface as a pop-up bookmark for a timeframe on a display screen of the display device, determining, by the television receiver, passage of the timeframe, and in response to determining passage of the timeframe, automatically removing, by the television receiver, the pop-up bookmark from the display screen.

In other examples, the method may include receiving, by the television receiver, user selection for a timeframe for automatically displaying the user interface on a display screen of the display device. The method may include adding, by the television receiver, the digital bookmark to a bookmarks table, and outputting, by the television receiver, the bookmarks table via the display device for user selection of the digital bookmark. The method may include receiving, by the television receiver, user selection for the digital bookmark presented via the display device, and/or outputting, by the television receiver, the media content from a scene of the media content corresponding to the digital bookmark. Further, the method may include removing, by the television receiver, the user interface from a display screen of the display device upon an absence of user interaction with the user interface during a timeframe.

In another aspect, a computer-readable medium having stored thereon a series of instructions which, when executed by a processor, cause the processor to tag media content is provided. The instructions may include detecting, by a television receiver, a distraction event during presentation of a media content via a display device. The instructions may include creating, by the television receiver, a digital bookmark for the media content, wherein the digital bookmark corresponds to the detected distraction event. Further, the instructions may include outputting, by the television receiver, a user interface for presenting the digital bookmark via the display device.

In yet another aspect, a system for tagging media content includes one or more processors and a memory communicatively coupled with and readable by the one or more processors, whereby the memory may have stored therein processor-readable instructions that are executable by the one or more processors. When executed, the processor-readable instructions may cause the one or more processor to detect, by a television receiver, a distraction event during presentation of a media content via a display device, and/or create, by the television receiver, a digital bookmark for the media content, whereby the digital bookmark corresponds to the detected distraction event. The processor-readable instructions may cause the one or more processors to output, by the television receiver, a user interface for presenting the digital bookmark via the display device.

It is noted that any of the elements and/or steps provided in the block diagrams, flow diagrams, method diagrams, and other illustrations of the figures may be optional, replaced, and/or include additional components, such as combined and/or replaced with other elements and/or steps from other figures and text provided herein. Various embodiments of the present invention are discussed below, and various combinations or modifications thereof may be contemplated.

DETAILED DESCRIPTION

In general, the systems and methods disclosed herein may tag a portion of a media content with a distraction bookmark upon detection of a distraction event, e.g. when a user is distracted from viewing the media content. For example, the media content may include a live and/or recorded television program being output for display on a display screen, such as via a television or any other display device. Upon detection that the user is distracted, the systems and methods disclosed herein may provide a distraction bookmark for output on the display screen. The distraction bookmark may appear as a small, non-intrusive pop-up covering or otherwise overlaying a small portion of the television program, which may continue to be output for presentation. Upon selection of the distraction bookmark, the user may return to a "last-seen" portion of the television program, which may include a scene of the program occurring at or before the distraction event is detected. In this way, the systems and methods disclosed herein may jump back to the last-seen portion and output the media content for viewing from that point. Further examples and variations are possible.

Various benefits may be offered by the systems and methods disclosed herein. The systems and methods may provide a convenient approach to viewing missed portions of media content. For example, if a plurality of viewers are watching a television program being output at the display device and conversations ensue, the systems and methods disclosed herein may detect that the user(s) are no longer paying attention to the displayed program, and bookmark a spot in the program where the distraction is detected, and/or bookmark a "last-seen" spot immediately prior to the distraction being detected. The bookmark may allow the user to easily jump back to a last-viewed spot of the media content and watch the rest of the content from thereon. This may prevent the user from missing any scenes and/or from having to manually browse through the recorded content to locate the last-viewed scene. Such recorded content may include live television programs having portions of buffered events and/or digital video recorded ("DVR") television programs. In another aspect, the systems and methods disclosed herein may utilize sensors and/or detectors, such as cameras and/or microphones, that are already provided by the viewing equipment and/or are easily connectable thereto.

Figure 1:
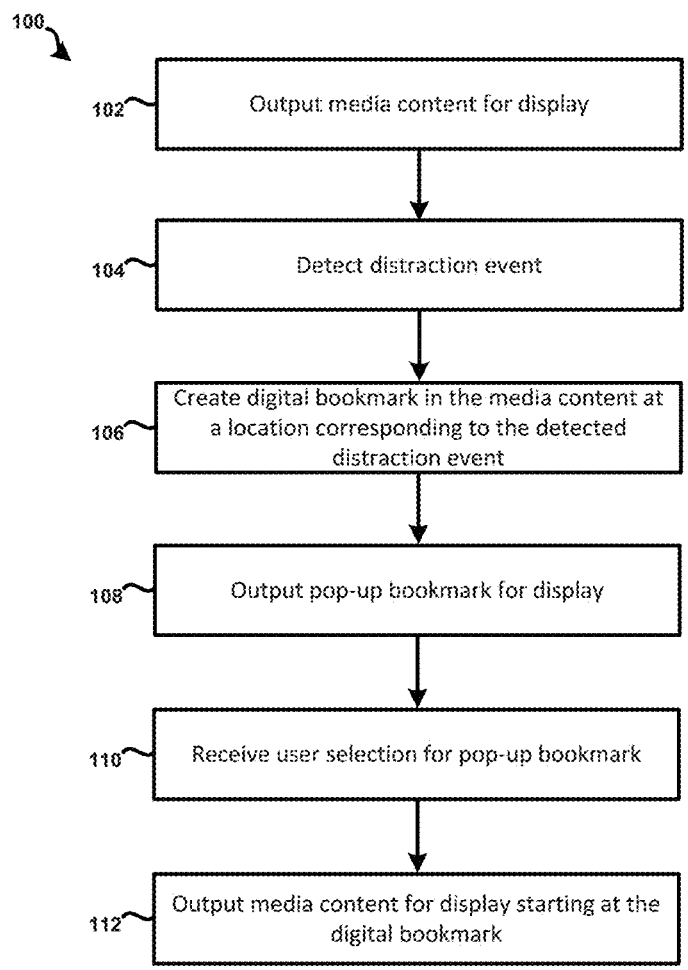
FIG. 1 shows an example method according to the present disclosure.

Turning now to FIG. 1, an example method 100 for tagging media content is provided. The method 100 may be implemented by a television receiver, and/or any other device that may receive and/or record media content. Further, the method 100 shown, and any other methods disclosed herein, may include additional and/or alternative steps in relation to the steps being shown. Any of the steps may be optional, rearranged, and/or combined. Numerous variations are possible.

As shown in FIG. 1, the method 100 may include outputting media content for display via a display device (step 102). The media content may include live media content, such as a broadcast television event, and/or recorded media content, such as DVR, Blu-Ray, and/or DVD content. Such media content may be received, by the television receiver, from a service provider via satellite communication and output, by the television receiver, for presentation to one or more users on a display screen of the display device, such as a television screen. In another aspect, the media content may include internet protocol television ("IPTV"), which may be received at the television receiver and/or at other devices operatively attached to the display device.

As further shown in FIG. 1, the method 100 may include detecting a distraction event (step 104). For example, the television receiver may detect and/or otherwise sense a presence of any distraction event(s) occurring during the presentation of the media content via the display device, e.g. while the media content is being shown on the display screen. In some cases, the television receiver may receive sensed data that is detected by a sensor. The sensed data may include a sound or sound level, a detected motion, an image, a sensed wireless signal, and/or other types of sensory outputs that may be indicative of the distraction event.

The sensor for detecting distraction events may include at least one of a camera, a microphone, a cellular phone detector, and/or any other sensors or combinations thereof. Merely by way of example, the cellular phone detector may detect if a cell phone located in an environment containing the display device is in use to determine if the user is distracted, e.g. on a call. In some examples, the sensor may include a microphone disposed on a remote control, television receiver, television, gaming console, and/or other devices in operative connection with the television receiver. In other examples, the sensor may include a camera on a television receiver and/or television positioned to capture user(s) in a viewing environment, e.g. a front-facing camera on a television to capture users in a living room. In other aspects, the camera includes a microphone, so that both images and sounds are sensed for distraction events. In still further aspects, the television receiver may detect an absence of a distraction event and/or when a detected distraction event has ended. In that case, the television receiver may determine that the user is not distracted.

Merely by way of example, the sensor may include a camera sensor that detects motion. For instance, the television receiver may receive a sensed movement detected by the sensor, and/or determine that the sensed movement corresponds to the user leaving the environment containing the display device during output of the media content. In that case, the television may determine the presence of the distraction event based on the sensed movement. For instance, the sensed movement may comprise a user moving out of a sensing range of the camera sensor. In other examples, the television receiver may detect the distraction event during a commercial break, or during other content that may be user-indicated and/or preprogrammed as less desirable to view. In that case, the television receiver may determine that a distraction event is not present, and/or watch for the user to return. If the user returns prior to the end of the commercial event, the television receiver may determine that the distraction event is not present. If the desired media content and/or television program is detected, by the television receiver, to resume prior to the user's return, or otherwise prior to detecting an end of the distracted event, then the television receiver may determine that the distraction event is present.

Still, other examples are possible. The television receiver may implement facial recognition to determine if the user is looking, or not looking, at the media content being output for display. In that case, the television receiver may receive sensed data that comprises facial recognition imagery, such as images of the user(s) captured in various time intervals during output of the media content. The television receiver may determine, based on the sensed data, that the user is not looking at the media content. In that case, the television receiver may determine that the user is distracted, e.g. the distraction event is present. In other cases, the television receiver may determine that the user is not looking at the media content during a commercial break, in which case the television receiver may determine that the distraction event is not present until the break has ended and the desired television programming begins.

In still other examples, the television receiver may detect distracting noises, such as a ringing phone, an airplane and/or ambulance, a crying baby, conversations, and so on by microphone sensors. Such sounds and frequencies thereof may be determined by receiving user-input and/or listening to the viewing environment to learn and categorize the sounds as distraction-indicative sounds. The television receiver may detect when a sound level hits a certain threshold. Such noises and thresholds may be user-defined. For instance, the television receiver may receive a threshold normal noise level for viewing media content from the user. In other cases, the television receiver may listen to determine the normal noise level, in which case a higher noise level may trigger determination of a distraction event. During output of the media content, the television receiver may monitor the viewing environment by listening to variations, increases, and/or decreases in the sound levels to determine presence and/or absence of distraction events. Merely by way of example, the television receiver may receive sensed data comprising an ambient noise level detected by the sensor, and/or determine if the ambient noise level exceeds the threshold noise level. If the threshold noise level is exceeded, the television receiver may determine presence of the distraction event. Other examples are possible.

Further shown in FIG. 1, the method 100 may include creating a digital bookmark in the media content at a location corresponding to the detected distraction event (step 106). The digital bookmark may include a marker that is placed in a file stream of the digital video recording and/or in a buffer portion of a live television broadcast being output. The digital bookmark may include metadata, such as a timestamp, that marks a spot in the file stream of the media content where the distraction event was detected and/or determined. In other aspects, the digital bookmark may be placed prior to the spot corresponding to detection of the distraction event. For example, the digital bookmark may be placed in a window occurring 1-5 seconds before the detection of the distraction event. Such windows may be user-customized and/or may be shortened, automatically, if the window runs into a commercial break preceding the distraction event being detected.

In one example, at step 106, the television receiver may create the digital bookmark for the media content, whereby the digital bookmark corresponds to the detected distraction event. The television receiver may determine that a time duration of the distraction event meets a minimum time duration. In response to determining the time duration of the distraction event meets the minimum time duration, the television receiver may create the digital bookmark for the media content and/or insert the digital bookmark in the media content. For instance, the time duration for the distraction event may be user-customizable to vary a sensitivity of the pop-up bookmarks service described herein. Merely by way of example, the sensed data may indicate a momentary lapse in the user's attention, whereupon the user quickly returns attention to the media content being output. In that case, the pop-up bookmark service may not be wanted and/or needed. The television receiver may receive user settings for specific time durations for certain detected distraction events and/or media content being output. The television receiver may require such specific time durations to be met prior to initiating creating and/or outputting the digital and/or distraction bookmarks. Further, the television receiver may time, via a timer, durations of the distraction events to compare such durations to a minimum, set time duration for triggering a pop-up bookmark and/or for creating and inserting the digital bookmark. In some cases, the windows for placing the digital bookmark may be the same, similar, and/or based on the minimum time durations for distraction events.

In a further example, the television receiver may determine a location of the distraction event in a media file of the media content. Upon determining the location, the television receiver may tag the media content with the digital bookmark at the determined location. Such locations of distraction events may be determined based on a ratio of a current byte count to a total byte count, whereby the current byte count may correspond to a file size of a portion of the media content preceding the distraction event, and the total byte count may correspond to a total file size of the media content.

Still further shown in FIG. 1, the method 100 may include outputting a pop-up bookmark for display (step 108). It is contemplated that the pop-up bookmark, or other user interface, may be displayed as an overlay on a portion of the display screen over the media content without pausing and/or stopping presentation of the media content. The pop-up bookmark may be provided in a corner or other non-intrusive position on the display screen. In some aspects, the television receiver may receive user selection for a position and/or type of pop-up bookmark.

Upon selection of the pop-up distraction bookmark, the media content may be output via the display device starting from the digitally bookmarked position in the file stream, which may coincide with the distraction event being detected. In some cases, the pop-up bookmark may not immediately appear upon detection of the distraction event.

Merely by way of example, the television receiver may determine if the duration of the distraction event exceeds a minimum duration, as described above, the pop-up is output. In another aspect, the television receiver may wait to output the pop-up, for instance, output the pop-up bookmark upon detecting the user has returned and/or has resumed attention to the media content being output. In this way, the television receiver senses that the user is no longer distracted and outputs the pop-up for view and selection by the user. Further, the television receiver may determine that the user has been absent for too long, e.g. the time duration of the distraction event has exceeded a maximum time value, whereby the television receiver may not display the pop-up bookmark and/or store the pop-up bookmark to a table of bookmarks for retrieval at a later time. In that case, the digital bookmark corresponding to the pop-up bookmark may also be stored to the same table or a different table of digital bookmarks.

It is contemplated that the pop-up distraction bookmark may automatically appear for a period of time before automatically disappearing if no user selection is received, and/or may be removed from the display screen upon user selection. In one example, the pop-up distraction bookmark may include a semi-transparent and/or opaque user interface for presenting the digital bookmark via the display screen. In another example, the television receiver may receive user selection for a timeframe for automatically outputting the user interface, e.g. pop-up distraction bookmark, for display on the display screen of the display device. In that case, the television receiver may start a timer coinciding with output of the pop-up bookmark, determine passage of the timeframe, and in response to determining passage of the timeframe, automatically remove the pop-up bookmark from the display screen. In another example, the television receiver automatically removes the user interface upon an absence of user interaction with the user interface during the timeframe.

Still, other examples are possible. As discussed previously, the pop-up bookmark and/or digital bookmark may be added to a table of bookmarks, whereby the table of bookmarks includes a plurality or a history of bookmarks. The television receiver may display the table of bookmarks and receive user selection for a particular bookmark. Such bookmarks may be deleted manually by the user, and/or automatically, for instance after an hour of being recorded to the table depending on an amount of time that the bookmarked media content remains available at the television receiver. For instance, the television receiver may automatically remove the digital bookmark from the media content upon passage of a storage period of time for the digital bookmark.

Further examples may be contemplated. A user may set a time of day for pop-up bookmarks to be active. For instance, the television may receive user specifications for outputting pop-up bookmarks during television viewing session occurring between 6-10 pm, and no pop-up bookmarks to occur at any other times. In another aspect, the television receiver may receive user selection for specific television programs and/or channels to enable pop-up bookmarks services, and/or specific media content to disable pop-up bookmark services. Still, in other examples, the television receiver may receive user selection for not having any pop-up bookmarks from being output to the display screen, while still storing such pop-up bookmarks in a table or menu, which may be manually retrieved and selected as desired. Merely by way of example, the television receiver may detect a swipe or slide motion on a touchpad of a remote control, and in response to determining such motions, display the pop-up bookmarks table and/or menu for output and user selection. Further, user settings for the distraction bookmarks may be based on other user settings for viewing media content and/or specific to unique user profiles. Merely by way of example, a reminder pop-up distraction bookmark may be provided by the television receiver to a web interface and/or mobile device connected thereto, to remind and/or provide access of available bookmarks to the user through other devices. Still, other examples are possible.

Further shown in FIG. 1, the method 100 may include receiving user selection for the pop-up bookmark (step 110). For example, the television receiver may detect that a user has highlighted and selected the pop-up distraction bookmark output on the display screen. In another example, the television receiver may detect depression of a dedicated button on a remote control to playback the media content directly at the bookmarked segment. In still another example, the television receiver may detect a length of time that a button is depressed on a remote control, e.g. the skip back button being depressed for five seconds, and automatically jump back to the scene corresponding to the distraction bookmark. It is contemplated that user selection of the pop-up bookmark may correspond to selection of the digital bookmark.

Still further shown in FIG. 1, the method 100 may include outputting media content for display via the display device starting at the digital bookmark (step 112). For instance, the television receiver may output the media content starting from a scene of the media content corresponding to the digital bookmark. The television receiver may continue recording live media content, which may enable the user to catch up with the live broadcast, for example, by jumping ahead at any point to the live broadcast if the user decides not to watch the missed portions. Still, other examples and variations are possible.

Figure 2:
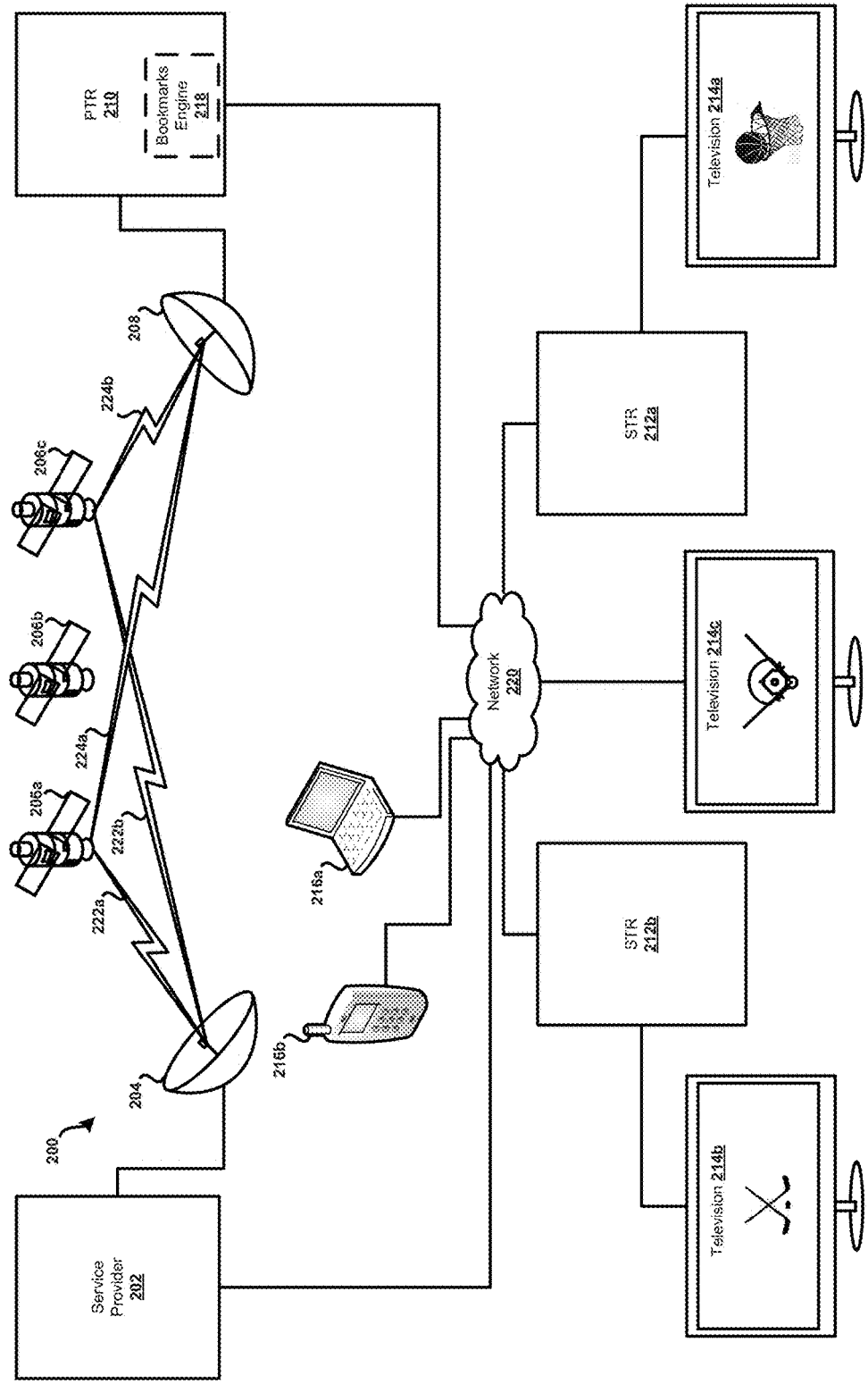
FIG. 2 shows an example satellite system according to the present disclosure.

Turning now to FIG. 2, an example satellite system 200 is shown in accordance with the present disclosure. For brevity, the satellite system 200 is depicted in a simplified form, and may generally include more or fewer systems, devices, networks, and/or other components as desired. Further, number and type of features or elements incorporated within the satellite system 200 may or may not be implementation-specific, and at least some of the aspects of the satellite system 200 may be similar to a cable television distribution system, an IPTV (Internet Protocol Television) content distribution system, and/or any other type of content distribution system.

In this example, the satellite system 200 may include a service provider 202, a satellite uplink 204, a plurality of orbiting (e.g., geosynchronous) satellites 206a-c, a satellite dish 208, a PTR (Primary Television Receiver) 210, a plurality of STRs (Secondary Television Receivers) 212a-b, a plurality of televisions 214a-c, and a plurality of computing devices 216a-b. The PTR 210 may include a bookmarks engine 218 that is programmatically configured to tag media content upon detection of a distraction event. As discussed throughout, the bookmarks engine 218 may be provided according to a particular hardware and/or firmware architecture of the PTR 210. In other examples, the bookmarks engine 218 may alternatively and/or additionally be provided in the STRs 212a-b, which may further provide and/or be operatively connected to one or more distraction-detection sensors. Such implementations may be beneficial and/or advantageous in many respects, as described further in the succeeding paragraphs.

The satellite system 200 may also include at least one network 220 that establishes a bidirectional communication path for data transfer between and among each respective element of the satellite system 200 outside of the unidirectional satellite signaling path. The network 220 is intended to represent any number of terrestrial and/or non-terrestrial network features or elements. For example, the network 220 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the satellite system 200.

The PTR 210, and the STRs 212a-b, as described throughout may generally be any type of television receiver, television converter, such as a STB (Set-Top-Box) for example, Blue-Ray player, DVD player, IPTV box, etc. In another example, the PTR 210, and the STRs 212a-b, may exhibit functionality integrated as part of or into a television, a DVR, a computer such as a tablet computing device, or any other computing system or device, as well as variations thereof. Further, the PTR 210 and the network 220, together with the STRs 212a-b and televisions 214a-c, and possibly the computing devices 216a-b, may be incorporated within or form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example satellite system 200 may be configured to communicate in accordance with the MoCA® (Multimedia over Coax Alliance) home entertainment networking standard. Still other examples are possible.

In practice, the satellites 206a-c may each be configured to receive uplink signals 222a-b from the satellite uplink 204. In this example, the uplink signals 222a-b may contain one or more transponder streams of particular data or content, such as particular television channel, that is supplied by the service provider 202. For example, each of the respective uplink signals 222a-b may contain various media content such as a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c. Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206-a, and etc.

The satellites 206a-c may further be configured to relay the uplink signals 222a-b to the satellite dish 208 as downlink signals 224a-b. Similar to the uplink signals 222a-b, each of the downlink signals 224a-b may contain one or more transponder streams of particular data or content, such as various encoded and/or at least partially electronically scrambled television channels, on-demand programming, etc., in accordance with an allotted carrier frequency and bandwidth. The downlink signals 224a-b, however, may not necessarily contain the same or similar content as a corresponding one of the uplink signals 222a-b. For example, the uplink signal 222a may include a first transponder stream containing at least a first group or grouping of television channels, and the downlink signal 224a may include a second transponder stream containing at least a second, different group or grouping of television channels. In other examples, the first and second group of television channels may have one or more television channels in common. In sum, there may be varying degrees of correlation between the uplink signals 222a-b and the downlink signals 224a-b, both in terms of content and underlying characteristics.

Continuing with the example implementation-specific scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 224a-b, from one or more of the satellites 206a-c. Based on the characteristics of the PTR 210 and/or satellite dish 208, however, it may only be possible to capture transponder streams from a limited number of transponders concurrently. For example, a tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. In this example, the HD channel may be output to the television 214c in accordance with the HDMI/HDCP content protection technologies. Other examples are possible.

Further, the PTR 210 may select via tuner, decode, and relay particular transponder streams to one or both of the STRs 212a-b, which may in turn relay particular transponder streams to a corresponding one of the television 214a and the television 214b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of STR 212a in accordance with a particular content protection technology and/or networking standard. Still further, the satellite dish 208 and the PTR 210 may, respectively, be configured to receive, decode, and relay at least one premium television channel to one or both of the computing devices 216a-b. Similar to the above-examples, the television channel may generally be presented live, or from a recording as previously stored on the PTR 210, and may be output to one or both of the computing devices 216*a-b* in accordance with a particular content protection technology and/or networking standard.

Figure 3:
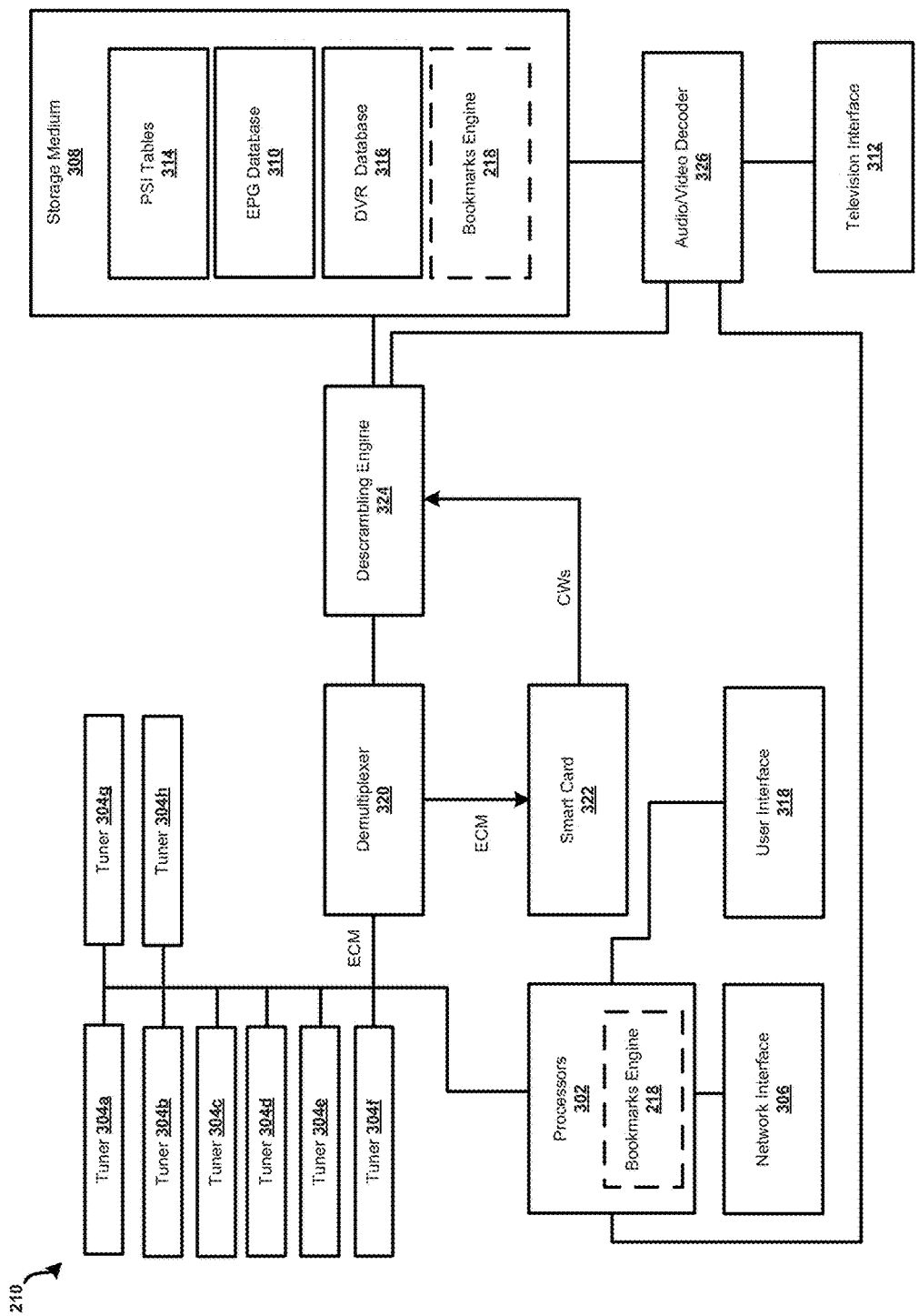
FIG. 3 shows an example block diagram for a television receiver according to the present disclosure.

Referring now to FIG. 3, an example block diagram of the PTR 210 of FIG. 2 is shown in accordance with the present disclosure. In some examples, at least one of the STRs 212*a-b* may be configured in a manner similar to that of the PTR 210. In other examples, at least one of the STRs 212*a-b* may be configured to exhibit a reduced functionality as compared to the PTR 210, and may depend at least to a certain degree on the PTR 210 to implement certain features or functionality. In this example, the STRs 212*a-b* may be referred to as a "thin client."

For brevity, the PTR 210 is depicted in a simplified form, and may generally include more or fewer elements or components as desired in accordance with the present disclosure. For example, the PTR 210 is shown in FIG. 3 to include the bookmarks engine 218. In general, and as discussed in further detail below, the bookmarks engine 218 may be configured to provide for one or more aspects of tagging media content upon detection of a distraction event. Other examples are possible as well.

Additionally, although not explicitly shown in FIG. 3, the PTR 210 may include one or more logical modules configured to implement a television streaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Additionally, the PTR 210 may be configured to include any number of other various components or logical modules that are implemented in hardware, software, firmware, or any combination thereof, and such components or logical modules may or may not be implementation-specific.

Referring still to FIG. 3, the PTR 210 in this example includes one or more processors 302, a plurality of tuners 304*a-h*, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, and at least one decoder 326. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304*a-h* may be used to tune to television channels, such as television channels transmitted via satellites (not shown). Each one of the tuners 304*a-h* may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304*a*) may be used to tune to a television channel on a first transponder stream for display using a television, while another tuner (e.g., tuner 304*b*) may be used to tune to a television channel on a second transponder for recording and viewing at some other time. If multiple television channels transmitted on the same transponder stream are desired, a particular tuner (e.g., tuner 304*c*) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, twelve tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites, which may be unidirectional to the PTR 210, and another communication channel between the service provider 202 and the PTR 210, which may be bidirectional, may be via a network, such as various wireless and/or hardwired packet-based communication networks, including, for example, a WAN (Wide Area Network), a HAN (Home Area Network), a LAN (Local Area Network), a WLAN (Wireless Local Area Network), the Internet, a cellular network, a home automation network, or any other type of communication network configured such that data may be transferred between and among respective elements of the satellite system 200. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the bookmarks engine 218 mentioned above. Recorded television programs may be stored using the storage medium 308.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites. For example, updates to the EPG database 310 may be received periodically via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example, eight television channels may be decoded concurrently or simultaneously.

The television interface 312 outputs a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-h and/or may be received via the network interface 306 over the network from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), a PMT (Program Management Table), etc.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more viewers or users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-h, television channels received via satellite may contain at least some encrypted or scrambled data. Packets of audio and video may be scrambled to prevent unauthorized users, such as nonsubscribers, from receiving television programming without paying the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user, e.g., an individual who is associated with the PTR 210, has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio.

Descrambled video and/or audio may be output by the descrambling engine 324 to the storage medium 308 for storage, such as part of the DVR database 316 for example, and/or to the decoder 326 for output to a television or other presentation equipment via the television interface 312.

For brevity, the PTR 210 is depicted in a simplified form, and may generally include more or fewer elements or components as desired, including those configured and/or arranged for implementing various features associated with intelligently allocating idle tuner resources to buffer or record broadcast programming determined as desirable, as discussed in the context of the present disclosure. For example, the PTR 210 is shown in FIG. 3 to include the bookmarks engine 218 as mentioned above in connection with FIG. 2. Further, some routing between the various modules of the PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television streaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
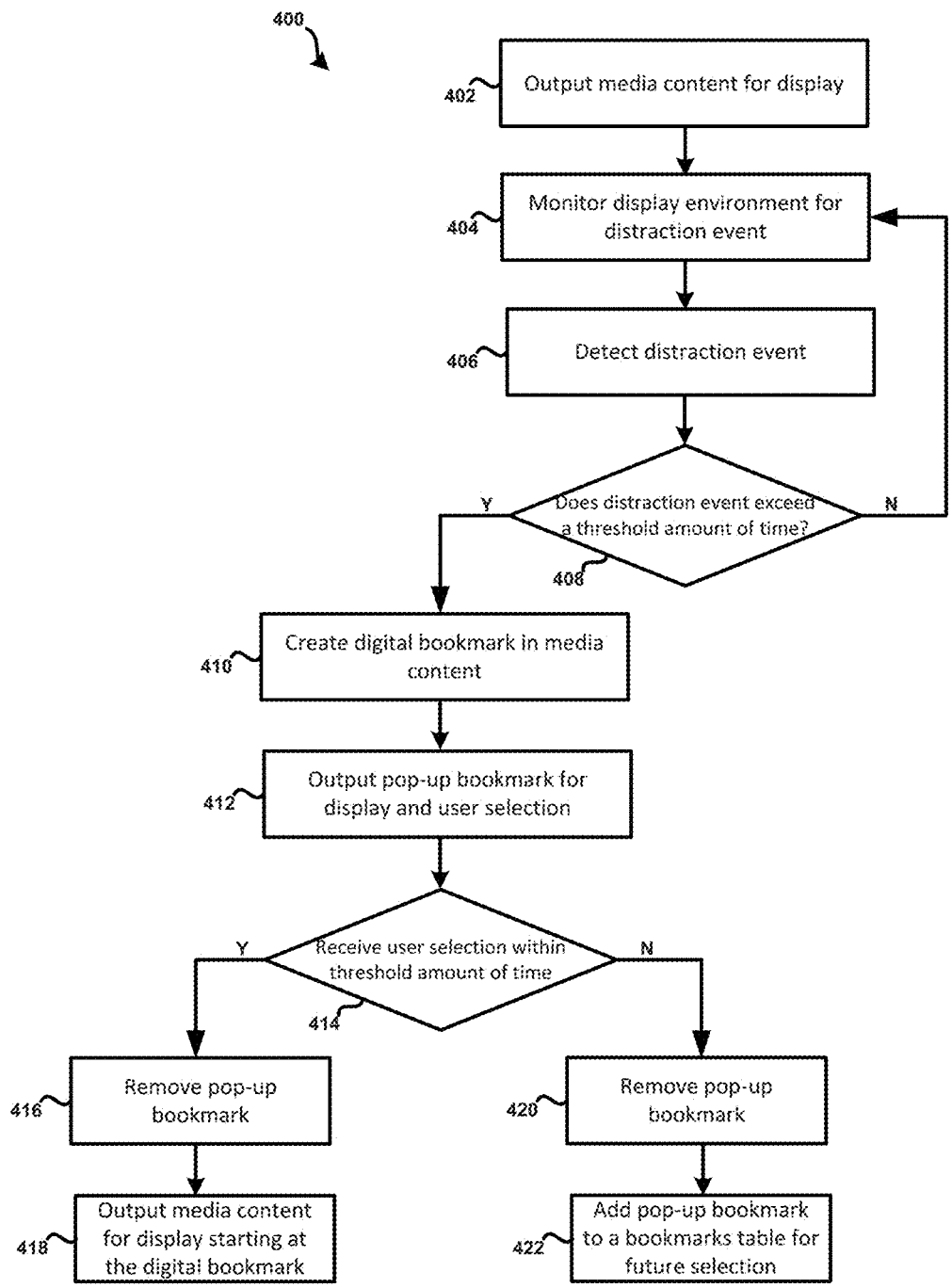
FIG. 4 shows another example method according to the present disclosure.

Turning now to FIG. 4, another example method 400 for tagging media content upon detection of a distraction event is shown according to various embodiments disclosed herein. The method 400 may be implemented by a television receiver, such as the television receiver 210 having the bookmarks engine 218 as shown in FIGS. 2 and 3, or any other device that may receive and/or record media content. It is contemplated that the method 400 may include any additional steps, and that the steps being shown may be rearranged in any manner and/or may be optional. Further, the method 400 may include any features of the method of FIG. 1, and/or any other elements disclosed elsewhere herein.

As shown in FIG. 4, the method 400 may include outputting media content for display via a display device, e.g. television (step 402). The method 400 may include monitoring a display environment, such as a room or area of viewing in front of the television, for a distraction event (step 404). Such monitoring may utilize camera and/or audio sensors to detect for movements and/or noises which may be determined, by the television receiver, as a distraction event. The method 400 may include detecting a distraction event (step 406). In some cases, determining the presence of a distraction event may include characterizing the sensed data as a distraction event, comparing the sensed data to threshold data, e.g. a threshold noise level, and/or determining a change in the sensed data, e.g. user motion and/or user leaving the environment. Other examples are possible.

As shown in FIG. 4, the method 400 may include determining if the distraction event exceeds a threshold amount of time (step 408). For instance, upon detection of the distraction event at step 406, the bookmarks engine 218 may start a timer to time a start of the distraction event to determine if the distraction event surpasses a threshold length of time, e.g. the user has been absent for a sufficient length of time to initiate bookmarking. If the distraction event does not exceed the threshold amount of time, the bookmarks engine 218 may continue monitoring for other distraction events. In another aspect, if the distraction event has exceeded the threshold amount of time, the bookmarks engine 218 may create a digital bookmark in the media content corresponding to the distraction event being detected (step 410). In that case, the bookmarks engine 218 may output a pop-up bookmark for display and user selection from the display screen (step 412). In some aspects, the bookmarks engine 218 may output the pop-up bookmark upon detecting that the distraction event has ended, upon detecting that the user has returned to the viewing environment, and/or upon detecting that the user has resumed watching the media content.

As shown in FIG. 4, the method 400 may include determining if a user selection has been received by the bookmarks engine 218 within a threshold amount of time (step 414). If user selection is received, the bookmarks engine 218 may remove the pop-up bookmark (step 416) from the display screen and/or output the media content for display starting at the scene marked by the digital bookmark (step 418). In another example, if user selection is not received, the bookmarks engine 218 may remove the pop-up bookmark from the display screen (step 420) and/or add the pop-up bookmark, and/or the digital bookmark corresponding thereto, to a bookmarks table for future selection (step 422). Other examples are possible.

Figure 5:
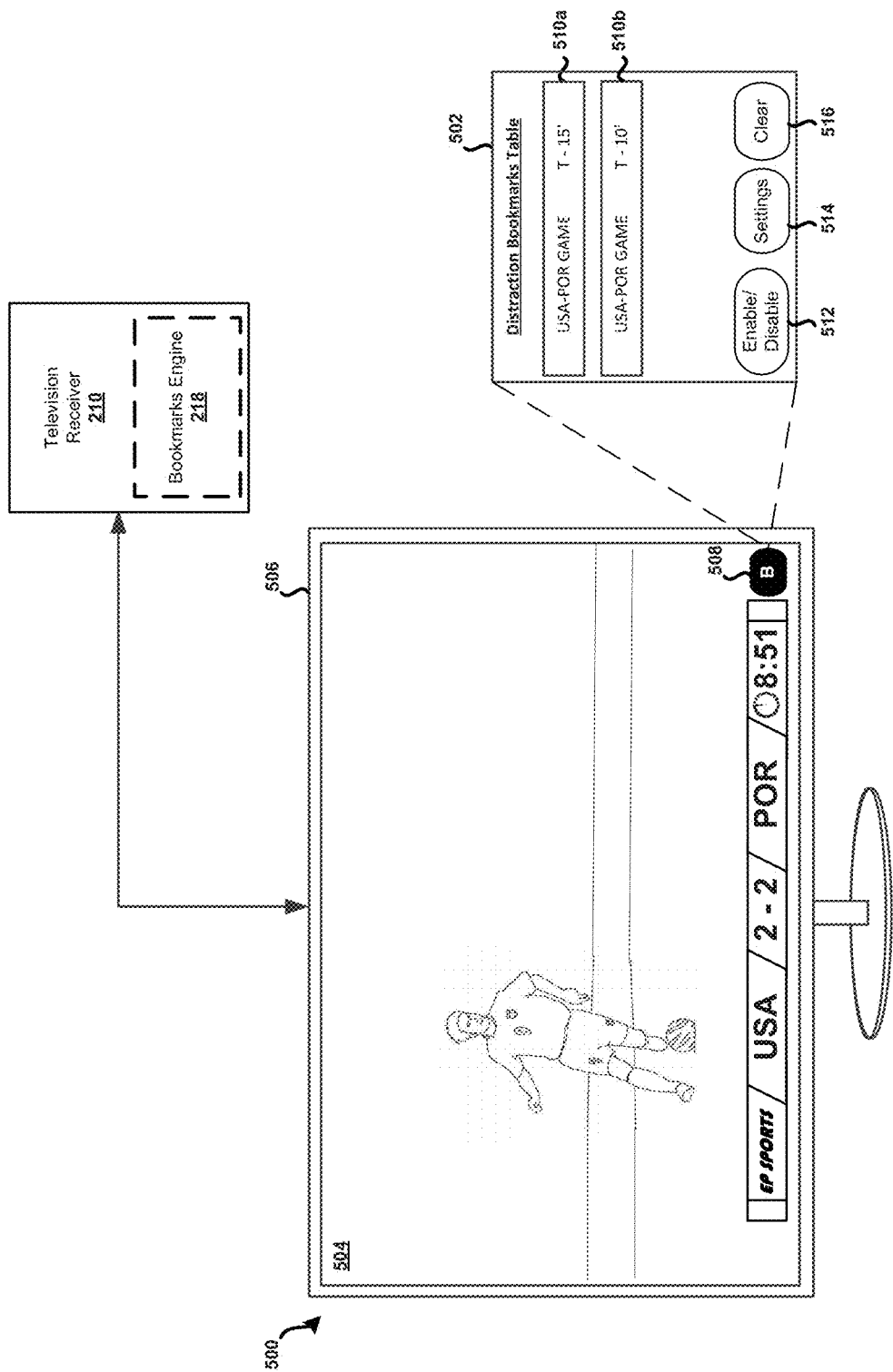
FIG. 5 shows an example user interface including a bookmarks display according to the present disclosure.

Turning to FIG. 5, an example user interface 500 including a bookmarks display 502 is shown. It is contemplated that the user interface 500 and/or the bookmarks display 502 may be provided on a display screen 504 of a display device 506, which may be operatively connected to the television receiver 210 and/or the bookmarks engine 218 thereof. An example media content for a soccer game is output for presentation on the display device 506. A pop-up distraction bookmark 508 is indicated in a lower right-hand corner of the display screen 504. Other locations are possible and may be configured by the user. In some examples, the pop-up distraction bookmark 508 may change color and/or flash to further indicate that a bookmarked media content is available. It is contemplated that selection of the pop-up bookmark 508 may playback the media content starting at the digitally bookmarked point in the file. In another example, the pop-up distraction bookmark 508 may include a scene or image from a bookmarked portion of the media content. In other examples, the pop-up distraction bookmark 508 may be selectable and open up to the bookmarks display 502. It is contemplated that the pop-up distraction bookmark 508 and/or the bookmarks display 502 may be transparent, semi-transparent, and/or opaque.

In the example bookmarks display 502, a table and/or listing of available distraction bookmarks 510a-b may be provided for user selection. For example, each bookmarked trigger event may be indicated by a button or bar and may include a brief description of the media content being bookmarked and/or other relevant information detected at the time of bookmarking, e.g. a brief description of the distraction event, such as a time or minutes lapsed since the distraction event was detected. In other examples, a screenshot of the video segment and/or an entire display screen taken at the time of bookmarking may be shown and/or provided as a background to each bookmark bar. Further, it is contemplated that the bookmarks display 502 may permit a user to scroll up and down to view and select additional distraction bookmarks. In another example, the user may select an enable and/or disable toggle button 512 to quickly turn on and/or off pop-up bookmarks. Other buttons may be provided, such as a settings button 514 to access setup procedures and/or a clear button 516 to clear the pop-up bookmarks 510a-b, to clear the digital bookmarks associated therewith, and/or to erase the recordings from the television receiver. Numerous other buttons may be displayed.

In another aspect, it is contemplated that distraction bookmarks 510a-b may be grayed out or otherwise altered by the bookmarks engine 218 to indicate that the user has previously viewed and/selected the distraction bookmark, and/or the media content relating to the distraction bookmark has already been viewed. In still other examples, a history of previous bookmarks may be displayed, whereby the media content for such bookmarked events may no longer be available in the bookmarks engine 218. In that case, historical bookmarks may be grayed or otherwise presented in a manner distinguishable from current bookmarks. Further, the historical bookmarks may link to a webpage and/or site whereby the media content may be downloadable by the user. For example, if the user missed accessing a previous distraction bookmark and the media content related thereto were no longer available, the user may select the historical bookmark, upon which the bookmarks engine 218 may present a website for paying and/or downloading the entire, or portion of, the television program. Still, other examples may be contemplated.

Figure 6:
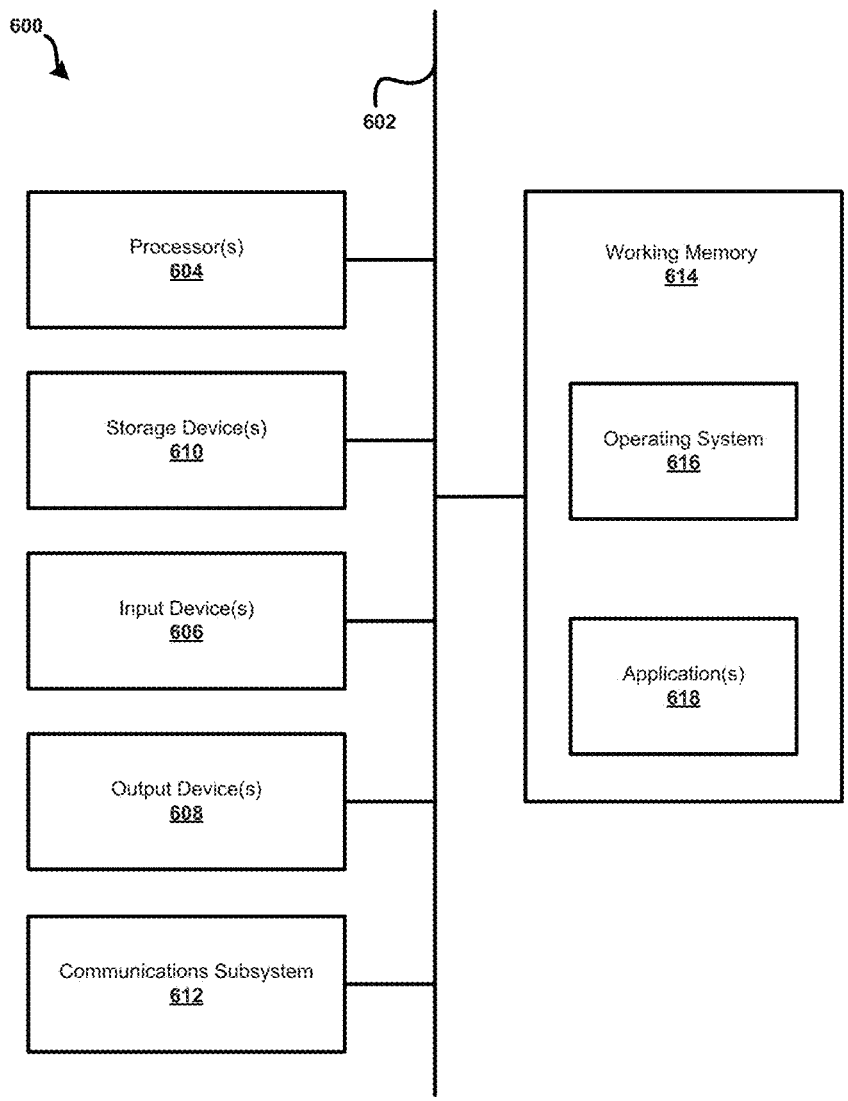
FIG. 6 shows an example block diagram for a computing system upon which various features of the present disclosure may be provided.

Turning now to FIG. 6, an example block diagram for a computer system or device 600 upon which various features of the present disclosure may be provided is shown. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 600, such as any of the respective elements of at least FIG. 2 and FIG. 3. In this manner, any of one or more of the respective elements of at least FIG. 2 and FIG. 3 may be configured to perform and/or include instructions that, when executed, perform the methods and features of FIG. 1, FIG. 4, and/or FIG. 5. Still further, any of one or more of the respective elements of at least FIG. 2 may be configured to perform and/or include instructions that, when executed, instantiate and implement functionality of the PTR 210 and/or the server(s).

The computer device 600 is shown comprising hardware elements that may be electrically coupled via a bus 602 (or may otherwise be in communication, as appropriate). The hardware elements may include a processing unit with one or more processors 604, including without limitation one or more general-purpose processors and/or one or more special-purpose processors (such as digital signal processing chips, graphics acceleration processors, and/or the like); one or more input devices 606, which may include without limitation a remote control, a mouse, a keyboard, and/or the like; and one or more output devices 608, which may include without limitation a presentation device (e.g., television), a printer, and/or the like.

The computer system 600 may further include (and/or be in communication with) one or more non-transitory storage devices 610, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 600 might also include a communications subsystem 612, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 612 may permit data to be exchanged with a network (such as the network described below, to name one example), other computer systems, and/or any other devices described herein. In many embodiments, the computer system 600 will further comprise a working memory 614, which may include a random access memory and/or a read-only memory device, as described above.

The computer device 600 also may comprise software elements, shown as being currently located within the working memory 614, including an operating system 616, device drivers, executable libraries, and/or other code, such as one or more application programs 618, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 610 described above. In some cases, the storage medium might be incorporated within a computer system, such as computer system 600. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 600) to perform methods in accordance with various embodiments of the disclosure. According to a set of embodiments, some or all of the procedures of such methods are performed by the computer system 600 in response to processor 604 executing one or more sequences of one or more instructions (which might be incorporated into the operating system 616 and/or other code, such as an application program 618) contained in the working memory 614. Such instructions may be read into the working memory 614 from another computer-readable medium, such as one or more of the storage device(s) 610. Merely by way of example, execution of the sequences of instructions contained in the working memory 614 may cause the processor(s) 604 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 600, various computer-readable media might be involved in providing instructions/code to processor(s) 604 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 610. Volatile media may include, without limitation, dynamic memory, such as the working memory 614.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 604 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 612 (and/or components thereof) generally will receive signals, and the bus 602 then might carry the signals (and/or the data, instructions, etc. carried by the signals) to the working memory 614, from which the processor(s) 604 retrieves and executes the instructions. The instructions received by the working memory 614 may optionally be stored on a non-transitory storage device 610 either before or after execution by the processor(s) 604.

It should further be understood that the components of computer device 600 can be distributed across a network. For example, some processing may be performed in one location using a first processor while other processing may be performed by another processor remote from the first processor. Other components of computer system 600 may be similarly distributed. As such, computer device 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method for tagging media content, comprising:
  detecting, by a television receiver, a distraction event during presentation of a media content via a display device;

creating, by the television receiver, a digital bookmark for the media content, wherein the digital bookmark corresponds to the detected distraction event;

determining a location of the distraction event in a media file of the media content wherein the location of the distraction event is based on a ratio of a current byte count to a total byte count, wherein the current byte count corresponds to a file size of a portion of the media content preceding the distraction event and the total byte count corresponds to a total file size of the media content;

determining a setback location that precedes the determined location;

determining that a commercial break from the media content overlaps with a time period between the setback location and the determined location;

determining an updated setback location in between the setback location and the determined location, wherein an updated time period between the updated setback location and the determined location does not include the commercial break;

tagging the media content with the digital bookmark at the updated setback location; and outputting, by the television receiver, a user interface for presenting the digital bookmark via the display device.

2. The method for tagging media content of claim 1, comprising:
receiving, by the television receiver, sensed data detected by a sensor, wherein the sensed data is indicative of the distraction event.

3. The method for tagging media content of claim 2, comprising:
wherein the sensor comprises at least one of a camera and a microphone.

4. The method for tagging media content of claim 1, comprising:
receiving, by the television receiver, a sensed movement detected by the sensor;
determining, by the television receiver, the sensed movement corresponds to a user leaving an environment containing the display device; and
determining, by the television receiver, presence of the distraction event based on the sensed movement.

5. The method for tagging media content of claim 1, comprising:
receiving, by the television receiver, sensed data comprising a facial recognition imagery detected by the sensor;
determining, by the television receiver, the facial recognition imagery corresponds to a user not watching the media content being presented via the display device; and
determining, by the television receiver, presence of the distraction event based on the sensed facial recognition imagery.

6. The method for tagging media content of claim 1, comprising:
receiving, by the television receiver, sensed data comprising an ambient noise level detected by the sensor;
determining, by the television receiver, the ambient noise level exceeds a threshold noise level; and
determining, by the television receiver, presence of the distraction event based on the ambient noise level exceeding the threshold noise level.

7. The method for tagging media content of claim 1, comprising:

determining, by the television receiver, that a time duration of the distraction event meets a minimum time duration; and
in response to determining the time duration of the distraction event meets the minimum time duration, creating, by the television receiver, the digital bookmark for the media content.

8. The method for tagging media content of claim 1, comprising:
wherein the media content comprises a broadcast television program.

9. The method for tagging media content of claim 1, comprising:
automatically removing, by the television receiver, the digital bookmark from the media content upon passage of a storage period of time for the digital bookmark.

10. The method for tagging media content of claim 1, comprising:
layering, by the television receiver, the user interface as an overlay on the media content being presented via the display device.

11. The method for tagging media content of claim 1, comprising:
receiving, by the television receiver, user selection for a timeframe for automatically displaying the user interface on a display screen of the display device.

12. The method for tagging media content of claim 1, comprising:
adding, by the television receiver, the digital bookmark to a bookmarks table; and
outputting, by the television receiver, the bookmarks table via the display device for user selection of the digital bookmark.

13. The method for tagging media content of claim 1, comprising:
receiving, by the television receiver, user selection for the digital bookmark presented via the display device; and
outputting, by the television receiver, the media content from a scene of the media content corresponding to the digital bookmark.

14. The method for tagging media content of claim 1, further comprising:
outputting, by the television receiver, a user interface for presenting the digital bookmark via the display device, wherein the user interface is presented as a pop-up bookmark for a timeframe on the display device;
determining, by the television receiver, passage of the timeframe and an absence of user interaction with the user interface during the timeframe; and
in response to determining passage of the timeframe and an absence of user interaction with the user interface during the timeframe, automatically removing, by the television receiver, the pop-up bookmark from the display screen.

15. A non-transitory computer-readable medium having stored thereon a series of instructions which, when executed by a processor, cause the processor to tag media content by:
detecting, by a television receiver, a distraction event during presentation of a media content via a display device;
creating, by the television receiver, a digital bookmark for the media content, wherein the digital bookmark corresponds to the detected distraction event;
determining a location of the distraction event in a media file of the media content, wherein the location of the distraction event is based on a ratio of a current byte count to a total byte count, wherein the current byte count corresponds to a file size of a portion of the media content preceding the distraction event and the total byte count corresponds to a total file size of the media content;

determining a setback location that precedes the determined location;

determining that a commercial break from the media content overlaps with a time period between the setback location and the determined location;

determining an updated setback location in between the setback location and the determined location, wherein an updated time period between the updated setback location and the determined location does not include the commercial break;

tagging the media content with the digital bookmark at the updated setback location; and outputting, by the television receiver, a user interface for presenting the digital bookmark via the display device.

16. The non-transitory computer-readable medium of claim 15, wherein the instructions further comprise:

determining, by the television receiver, that a time duration of the distraction event meets a minimum time duration; and in response to determining the time duration of the distraction event meets the minimum time duration, creating, by the television receiver, the digital bookmark for the media content.

17. The non-transitory computer-readable medium of claim 15, wherein the instructions further comprise:

outputting, by the television receiver, a user interface for presenting the digital bookmark via the display device, wherein the user interface is presented as a pop-up bookmark for a timeframe on the display device;

determining, by the television receiver, passage of the timeframe and an absence of user interaction with the user interface during the timeframe; and in response to determining passage of the timeframe and an absence of user interaction with the user interface during the timeframe, automatically removing, by the television receiver, the pop-up bookmark from the display screen.

18. A system for tagging media content, comprising:
one or more processors; and
a memory communicatively coupled with and readable by the one or more processors and having stored therein processor-readable instructions that, when executed by the one or more processors, cause the one or more processor to:

detect, by a television receiver, a distraction event during presentation of a media content via a display device;

create, by the television receiver, a digital bookmark for the media content, wherein the digital bookmark corresponds to the detected distraction event;

determine a location of the distraction event in a media file of the media content, wherein the location of the distraction event is based on a ratio of a current byte count to a total byte count, wherein the current byte count corresponds to a file size of a portion of the media content preceding the distraction event and the total byte count corresponds to a total file size of the media content;

determine a setback location that precedes the determined location;

determine that a commercial break from the media content overlaps with a time period between the setback location and the determined location;

determine an updated setback location in between the setback location and the determined location, wherein an updated time period between the updated setback location and the determined location does not include the commercial break;

tag the media content with the digital bookmark at the updated setback location; and output, by the television receiver, a user interface for presenting the digital bookmark via the display device.

* * * * *